United States Patent
Liao et al.

(10) Patent No.: US 12,261,928 B2
(45) Date of Patent: Mar. 25, 2025

(54) RECEIVERS AND METHOD WITH FAST SAMPLING PHASE AND FREQUENCY ACQUISITION

(71) Applicant: CREDO TECHNOLOGY GROUP LIMITED, Grand Cayman (KY)

(72) Inventors: Yu Liao, Longmont, CO (US); Junqing Sun, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 1 day.

(21) Appl. No.: 18/227,799

(22) Filed: Jul. 28, 2023

(65) Prior Publication Data

US 2025/0038944 A1 Jan. 30, 2025

(51) Int. Cl.
*H04L 7/00* (2006.01)
(52) U.S. Cl.
CPC .......... *H04L 7/0016* (2013.01); *H04L 7/0079* (2013.01)
(58) Field of Classification Search
CPC ... H04L 7/0016; H04L 7/0079; H04L 7/0087; H04L 7/002; H04L 7/0025; H04L 7/0029; H04L 7/0037; H04L 7/0033; H04L 7/0041; H04L 7/0083; H04L 2012/5674
See application file for complete search history.

(56) References Cited

U.S. PATENT DOCUMENTS

| | | | |
|---|---|---|---|
| 7,058,150 B2 | 6/2006 | Buchwald et al. | |
| 9,780,796 B2 * | 10/2017 | Kou | H03L 7/091 |
| 10,447,509 B1 | 10/2019 | Cai et al. | |
| 10,892,763 B1 | 1/2021 | Hidaka et al. | |
| 10,992,501 B1 | 4/2021 | Sun et al. | |
| 2003/0137765 A1 * | 7/2003 | Yamazaki | G11B 20/18 |
| 2011/0002211 A1 * | 1/2011 | Ratnakar Aravind | G11B 20/10037 |
| 2016/0173271 A1 * | 6/2016 | Kou | H04L 7/0029 375/355 |
| 2018/0316482 A1 * | 11/2018 | Gudovskiy | H03H 17/0642 |
| 2019/0013888 A1 * | 1/2019 | Li | H03L 7/00 |

OTHER PUBLICATIONS

Mueller, "Timing Recovery in Digital Synchronous Data Receivers", IEEE Trans. Commun., v24n5, May 1976.
Musa, "High-speed Baud-Rate Clock Recovery", U. Toronto Thesis, 2008.

* cited by examiner

*Primary Examiner* — Khanh C Tran
(74) *Attorney, Agent, or Firm* — Ramey LLP

(57) ABSTRACT

Fast sampling phase and frequency acquisition suitable for incorporation into various high bandwidth receivers and receiving methods. One illustrative integrated circuit receiver or "deserializer" design has: a clock circuit that provides a sample clock; an analog to digital converter that samples a receive signal in accordance with the sample clock to provide receive signal samples; and a clock recovery circuit. The clock recovery circuit includes: a phase and frequency acquisition module to determine and correct an initial frequency offset and an initial phase offset of the sample clock; and a feedback circuit to minimize timing error of the sample clock after the initial frequency offset and initial phase offset have been corrected.

18 Claims, 4 Drawing Sheets

RECEIVERS AND METHOD WITH FAST SAMPLING PHASE AND FREQUENCY ACQUISITION

BACKGROUND

Most integrated circuit devices have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("intellectual property (IP) core", "soft macro") but are frequently employed interchangeably.

The modular units can be expressed in different ways, e.g., in the form of a hardware description language (HDL) file, or as a fully routed design that could be directly printed to create a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description.

Serializer-deserializer (SerDes) cores are a frequent need for device designs that employ modern data communications standards, which continue to evolve towards higher symbol rates and larger numbers of bits per channel symbol due to continuing demand for ever-lower latencies and ever-higher transfer rates. The channel symbols are attenuated and dispersed as they propagate, causing intersymbol interference (151) at the receiving end of the channel. For a given channel bandwidth, this ISI worsens at higher symbol rates and larger symbol constellations. When trying to detect the channel symbols, receivers must contend with this ISI in addition to the channel noise that contaminates the receive signal. The open literature discloses many equalization and demodulation techniques for recovering digital data from the degraded receive signal even in the presence of ISI.

One technique for evaluating channels and equalization techniques is the "eye diagram", a representation of all possible paths the signal could follow within a given symbol interval, typically achieved via a superposition of many symbol intervals. Typically, the optimum sampling instant is near the mid-point of the symbol interval, where it is hoped that an opening can be found between the signal paths representing different symbol values. When such an opening exists, a comparator may be used to detect the transmitted symbol by comparing the equalized signal value to a decision threshold at the opening's center. The reliability of such decisions depends on the amount of noise relative to the distance between the decision threshold and the edges of the opening. The error rate is minimized when the sampling occurs at the optimum point in each symbol interval. Again, the open literature discloses many timing recovery techniques which can be employed in conjunction with the various equalization and modulation techniques to determine the sampling frequency and optimum sampling phase.

A popular timing recovery technique is the clock data recovery (CDR) loop that operates on digitized samples of the receive signal, equalized signal, and/or symbol decisions to measure timing error, combined with a feedback loop to minimize the timing error. Timing error estimator examples include, e.g., a bang-bang or proportional phase detector. One suitable timing error estimator is set forth in co-owned U.S. Pat. No. 10,447,509, "Precompensator-based quantization for clock recovery". Other suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008.

While the CDR loop approach offers many advantages including accuracy and ease of implementation, the inherent loop delay (arising from various sources including analog to digital conversion, timing error estimation, and filtering) necessitates a limited loop bandwidth to ensure loop stability. In a recent 56 Gbd SerDes module design, the CDR loop bandwidth is limited to approximately 10 MHz, meaning that it typically requires hundreds of nanoseconds for the CDR loop to reach steady state tracking from startup. (At 56 Gbd, this translates into more than 10,000 symbols.) In some contexts, any link connection delay in excess of a few nanoseconds is unacceptable.

SUMMARY

Accordingly, there is disclosed herein various receivers and receiving methods incorporating fast sampling phase and frequency acquisition. One illustrative integrated circuit receiver or "deserializer" design has: a clock circuit that provides a sample clock; an analog to digital converter that samples a receive signal in accordance with the sample clock to provide receive signal samples; and a clock recovery circuit. The clock recovery circuit includes: a phase and frequency acquisition module to determine and correct an initial frequency offset and an initial phase offset of the sample clock; and a feedback circuit to minimize timing error of the sample clock after the initial frequency offset and initial phase offset have been corrected.

One illustrative method includes: sampling a receive signal in response to a sample clock to provide receive signal samples, the sample clock having an initial frequency; obtaining a sampling clock phase estimate from each of multiple pairs of the receive signal samples; differencing the sampling clock phase estimates to determine an initial frequency offset; and correcting a source of the sample clock to compensate for the initial frequency offset.

The foregoing receivers and methods may further be embodied as semiconductor IP cores representing schematics using, e.g., a hardware description language, or representing semiconductor manufacturing process mask patterns using, e.g., GDSII or OASIS language, residing on nontransient information storage media.

Each of the foregoing embodiments may be implemented individually or conjointly and may be implemented with any one or more of the following features in any suitable combination: 1. the analog to digital converter is one of a set of analog to digital converters that sample the receive signal in response to staggered versions of the sample clock to provide a parallel set of receive signal samples. 2. the integrated circuit includes an equalizer that converts the receive signal samples into equalized signal samples. 3. the phase and frequency acquisition module uses the receive signal samples or the equalized signal samples to derive the initial frequency offset and the initial phase offset. 4. the phase and frequency acquisition module estimates a sampling clock phase using ratios of equalized signal sample pairs during a preamble period. 5. the sampling clock phase estimates are each calculated as an arctangent of one of said ratios. 6. the phase and frequency acquisition module estimates a frequency offset based on one or more differences between the sampling clock phase estimates. 7. the clock recovery circuit includes a phase lock loop having an initial division ratio, the phase and frequency acquisition module being configured to correct the initial frequency offset by adjusting the initial division ratio. 8. the clock recovery circuit includes a phase interpolator having an initial phase setting, the phase and frequency acquisition module being configured to correct the initial phase offset by adjusting the initial phase setting. 9. the method includes: combining at least some of the sampling clock phase estimates to obtain an initial phase offset; and correcting a source of the sample clock to compensate for the initial phase offset. 10. The method includes: after correcting the source of the sample clock to compensate for the initial frequency offset and the initial phase offset, enabling a clock recovery loop to minimize timing error.

DETAILED DESCRIPTION

Figure 1:
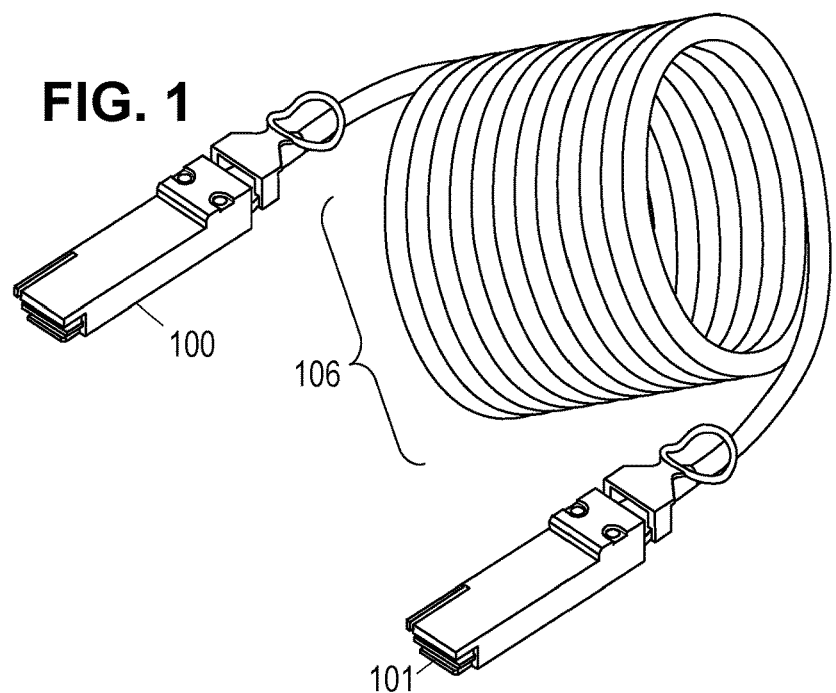
FIG. 1 is a perspective view of an illustrative active Ethernet cable ("AEC").

While specific embodiments are given in the drawings and the following description, keep in mind that they do not limit the disclosure. On the contrary, they provide the foundation for one of ordinary skill to discern the alternative forms, equivalents, and modifications that are encompassed in the claim scope.

High bandwidth receivers, or "deserializers" are used in many contexts ranging from intrachip communications to long distance wireless, wired, and fiberoptic communications. To provide one specific example, FIG. 1 shows an illustrative active Ethernet cable ("AEC") that may be used to provide a high-bandwidth communications link between devices in a routing network such as those used in data centers, server farms, and interconnection exchanges. The routing network may be part of, or may include, for example, the Internet, a wide area network, a local area network, or a storage area network. The linked devices may be computers, switches, routers, and the like. The illustrative cable includes a first connector 100 and a second connector 101 that are connected via electrical conductors 106 in a cord. The electrical conductors 106 may be arranged in a paired form such as with twinaxial conductors. (Twinaxial conductors can be likened to coaxial conductors, but with two inner conductors instead of one.) The inner conductors may be driven with a differential signal and their shared shield may operate to reduce crosstalk with other twinaxial conductors in the cable. Depending on the performance criteria, it may be possible to employ other paired conductor or single-ended conductor implementations.

Pursuant to the Ethernet standard, each conductor pair may provide unidirectional transport of a differential signal. To enable robust performance over even extended cable lengths, each connector 100, 101 may include a powered transceiver that performs clock data recovery ("CDR") combined with demodulation and re-modulation of the data streams moving in each direction. Such powered transceivers are also known as data recovery and re-modulation ("DRR") devices. The connectors 100, 101 may be pluggable modules compliant with any one of the pluggable module standards, e.g., SFP, SFP-DD, QSFP, QSFP-DD, OSFP. In at least one contemplated embodiment, the cable connectors 100, 101 are quad small form-factor pluggable ("QSFP") transceiver modules that can exchange an 800GAUI-8 data stream with the host using PAM4 signaling at a nominal baud rate of 56 Gbd in each of the eight lanes.

Figure 2:
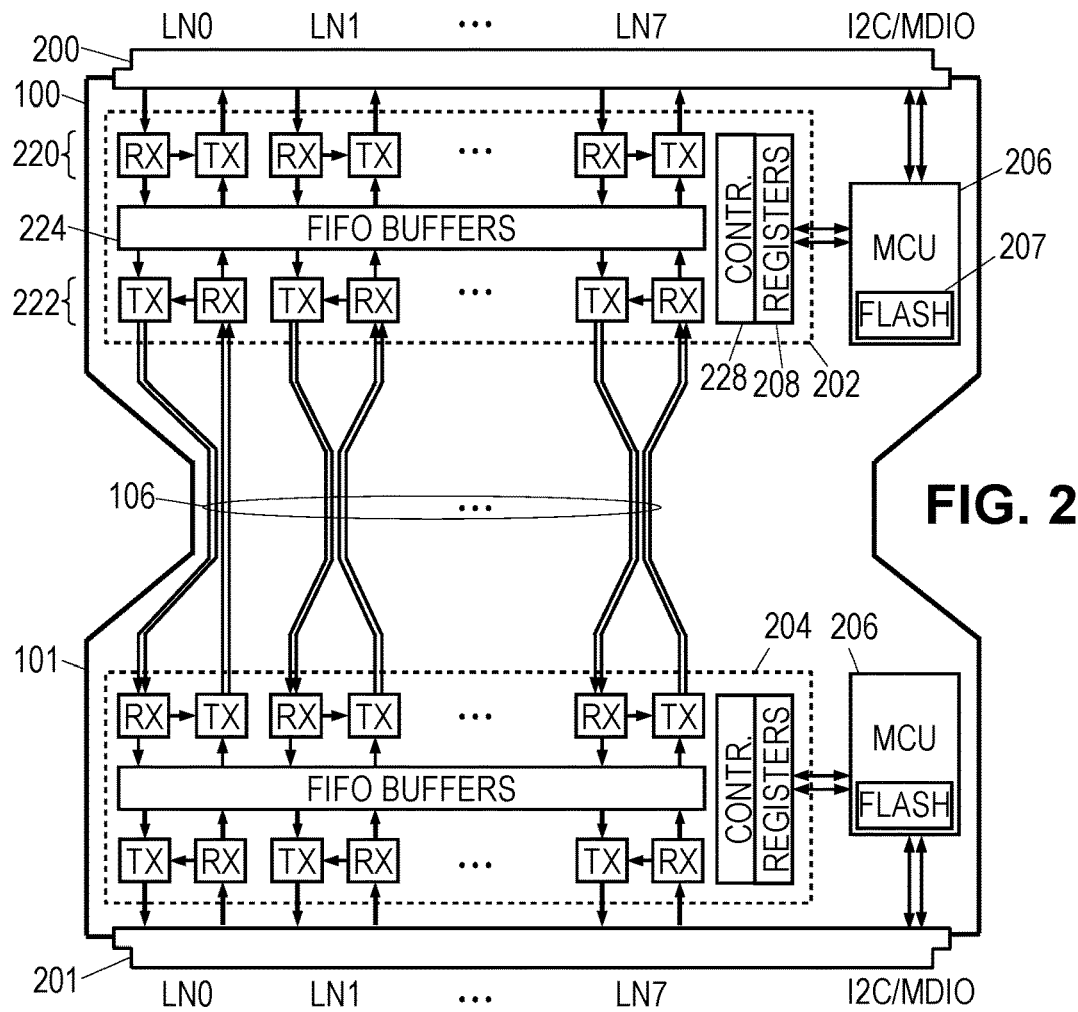
FIG. 2 is a block diagram of an illustrative AEC.

FIG. 2 is a block diagram of an illustrative AEC. Connector 100 includes a plug 200 adapted to fit a standard-compliant Ethernet port in a first host device to receive an electrical input signal carrying a data stream from the host device and to provide an electrical output signal carrying a data stream to the host device. Similarly, connector 101 includes a plug 201 that fits an Ethernet port of a second host device. Connector 100 includes a first DRR device 202 to perform CDR, demodulation, and re-modulation of the data streams entering and exiting the cable at connector 100, and connector 101 includes a second DRR device 204 to perform CDR, demodulation, and re-modulation of the data streams entering and exiting the cable at connector 101. The DRR devices 202, 204 may be integrated circuits mounted on a printed circuit board and connected to edge connector contacts via circuit board traces. The electrical conductors 106 and shields may be soldered to corresponding pads on the printed circuit board that electrically connect to the DRR devices.

In at least some contemplated embodiments, the printed circuit boards each also support a micro-controller unit ("MCU") 206. Each DRR device 202, 204 is coupled to a respective MCU device 206 which configures the operation of the DRR device via a first two-wire bus. At power-on, the MCU device 206 loads equalization parameters and/or other operating parameters from Flash memory 207 into the DRR device's configuration registers 208. The host device can access the MCU device 206 via a second two-wire bus that operates in accordance with the I2C bus protocol and/or the faster MDIO protocol. With this access to the MCU device 206, the host device can adjust the cable's operating parameters and monitor the cable's performance.

Each DRR device 202, 204, includes a set 220 of transmitters and receivers for communicating with the host device and a set 222 of transmitters and receivers for sending and receiving via conductor pairs running the length of the cable. The cable-facing transceivers 222 preferably send and receive using differential PAM4 at 56 Gbd in each direction over each lane. The illustrated host-facing transceivers 220 support eight lanes LN0-LN7 for bidirectional communication with the host device, each bidirectional lane formed by two unidirectional connections with differential PAM4 signaling at 56 Gbd, such as may be achieved with 800GBASE-KR8. The DRR devices include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring the training phase is complete across all lanes and links before enabling the transmitters and receiver to enter the data transfer phase. The embedded controller 228 employs a set of registers 208 to receive commands and parameter values, and to provide responses potentially including status information and performance data.

Figure 3:
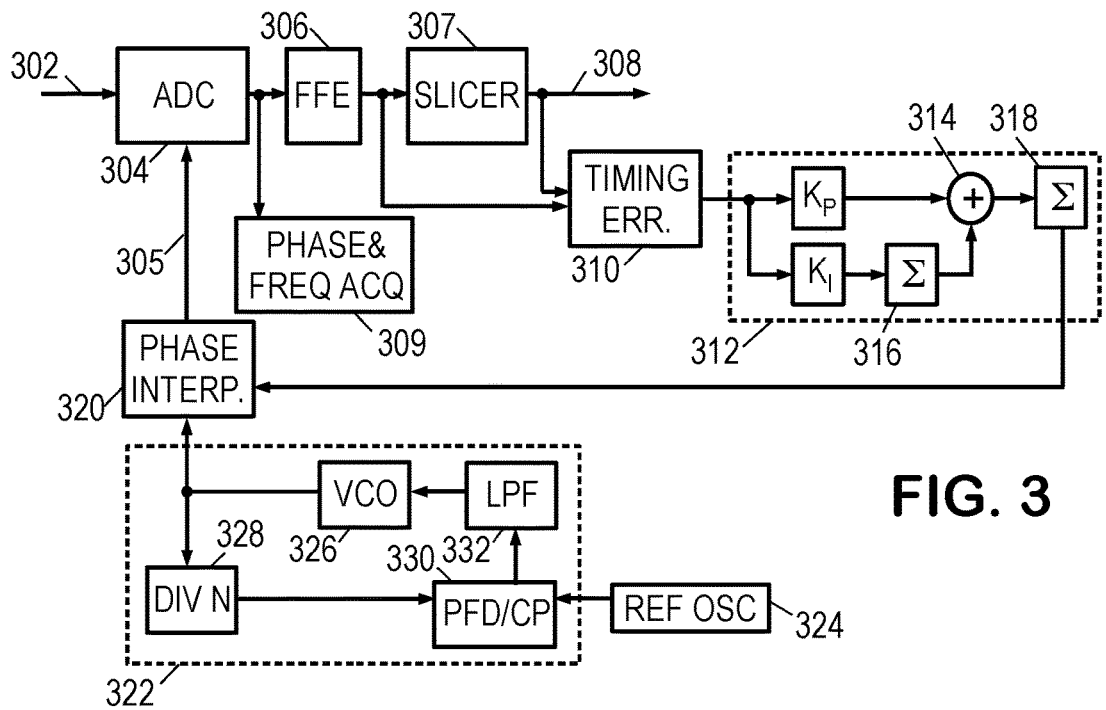
FIG. 3 is a block diagram of an illustrative digital communications receiver.

FIG. 3 is a first illustrative digital receiver that may be used as part of the transceiver sets 220, 222. It includes an analog-to-digital converter ("ADC") 304 that samples an analog receive signal 302 at sample times corresponding to transitions in a sampling clock signal 305, thereby providing samples of a digital receive signal to a filter ("feed forward equalizer" or FFE) 306, which converts the digital receive signal samples into equalized signal samples having reduced intersymbol interference. A slicer 307 compares the equalized signal samples to suitable decision thresholds to determine which symbol was transmitted in each symbol interval. The resulting stream of demodulated symbols 308 may be processed in accordance with the relevant communications protocol to recover the relevant information from the data stream, e.g., using frame alignment, de-interleaving, error-correction, and descrambling operations.

The illustrative receiver includes a clock recovery circuit to generate a suitable sampling clock signal 305. In FIG. 3, the clock recovery circuit includes a phase and frequency acquisition module 309 and a feedback loop that begins with timing error estimator 310. The timing error estimator 310 can use any suitable timing error estimation technique, e.g., the formulas in Mueller-Müller, "Timing Recovery in Digital Synchronous Data Receivers", IEEE Trans. Commun., v24 n5, May 1976. A timing loop filter 312 filters the estimated timing error signal to obtain a timing control signal for a phase interpolator 320. In the embodiment of FIG. 3, the timing loop filter 312 is a second order proportional-integration (PI) filter having a summer 314, which receives along a first path a proportional (i.e., scaled by a constant coefficient $k_P$) component of the timing error signal, and receives along a second path an integrated (i.e., scaled by a constant coefficient $k_I$ and integrated by integrator 316) component of the timing error signal. The received components are added and provided to a second integrator 318, which integrates the sum to provide the timing control signal to the phase interpolator 320.

The phase interpolator 320 also receives a clock signal from a phase lock loop (PLL) 322. The timing control signal causes the phase interpolator 320 to produce the sampling signal by adjusting the phase of the clock signal in a fashion that minimizes an expected value of the timing error. In other words, the timing control signal compensates for both the frequency offset and phase error of the PLL output signal relative to the analog data signal 302, thereby phase-aligning the sampling clock 305 with the data symbols in the analog receive signal.

The clock signal produced by PLL 322 is a frequency-multiplied version of a reference clock signal from a reference oscillator 324 or other clock source. A voltage-controlled oscillator ("VCO") 326 supplies the clock signal to both the phase interpolator 320 and to a counter 328 that divides the frequency of the clock signal by a constant or variable modulus N that provides a specified division ratio. The counter supplies the divided-frequency clock signal to a phase-frequency detector ("PFD") 330. PFD 330 may use a charge pump ("CP") as part of determining which input (i.e., the divided-frequency clock signal or the reference clock signal) has transitions earlier or more often than the other. A low pass filter 332 filters the output of PFD 330 to provide a control voltage to VCO 326. The filter coefficients are chosen so that the divided frequency clock becomes phase aligned with the reference oscillator.

Note that for at least some contemplated uses, the reference clock used by the receiver will often drift relative to the reference clock used by the transmitter and may differ by hundreds of ppm. In the embodiment of FIG. 3, the resulting frequency offset between the PLL's clock signal output and the analog data signal can be corrected by adjusting the modulus N of the counter 328 and/or by suitably setting the integrator 316 to provide continuous phase rotation in the phase interpolator 320. Other feedback loop implementations are available in the open literature and would also be suitable for use in the disclosed embodiments.

The inherent loop delay of the feedback loop is stabilized with suitable design of the timing loop filter to limit the response bandwidth, but this limit can cause an undesirable delay in achieving minimal timing error. The phase and frequency acquisition module 309 addresses this issue by estimating an initial frequency offset and phase offset of the sampling clock signal 305 during a preamble phase in which the transmitter sends symbol doublets that alternate in sign, e.g., +1, +1, −1, −1, +1, +1, −1, −1, . . . . Preferably the transmitter uses the maximum amplitude symbols for the preamble, so that for PAM4, the preamble would be a sequence of +3, +3, −3, −3, repetitions. As explained further below, the phase and frequency acquisition module 309 enables the initial frequency offset and initial phase offset to be determined and corrected in less than about 200 symbols, shortening the normal convergence time of the feedback loop by a couple orders of magnitude. The phase and frequency acquisition module 309 can perform this determination based on the receive signal samples or optionally on the equalized signal samples. The equalized signal samples can be the output of the FFE filter 306 as shown in FIG. 3, or they can be the input of the slicer 307 as shown in the decision feedback equalizers of FIGS. 4-5.

Figure 4:
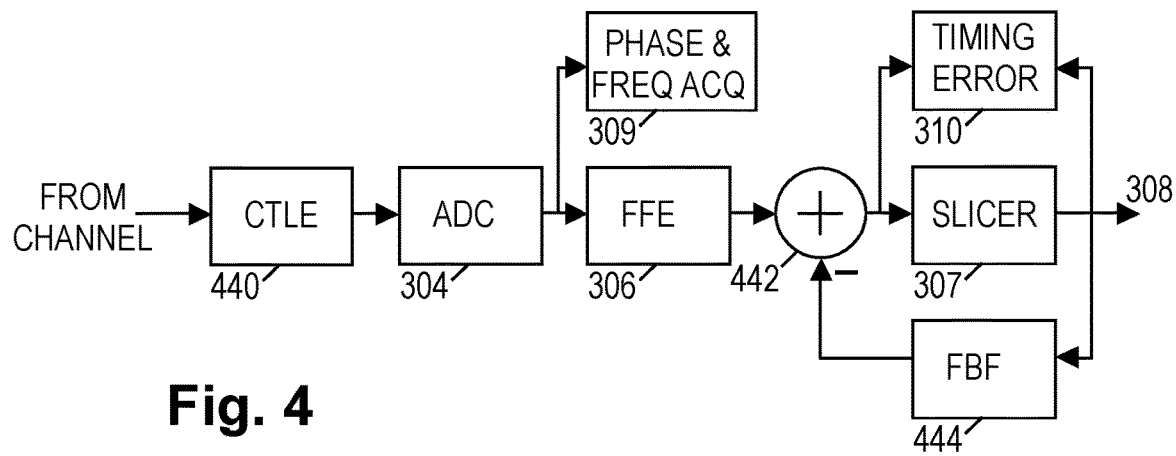
FIG. 4 is a block diagram of an illustrative decision feedback equalizer ("DFE").

FIG. 4 shows one illustrative implementation of a decision feedback equalizer-based receiver. Prior to sampling, the analog channel signal 302 is filtered by a continuous time linear equalizer ("CTLE") 440 to attenuate out-of-band noise and to optionally provide some spectral shaping to improve a response to high-frequency components of the receive signal. (The receiver of FIG. 3 may also include a similar analog filter.) ADC 304 is provided to digitize the receive signal, and an FFE filter 306 performs further equalization to further shape the overall channel response of the system and minimize the effects of leading ISI on the current symbol. As part of the shaping of the overall channel response, the FFE filter 306 may also be designed to shorten the channel response of the filtered signal while minimizing any attendant noise enhancement.

An adder 442 subtracts an optional feedback signal from the output of FFE 306 to minimize the effects of trailing ISI on the current symbol, yielding an equalized signal that is coupled to a decision element ("slicer") 307. The decision element 307 includes one or more comparators that compare the equalized signal to corresponding decision thresholds to determine for each symbol interval which constellation symbol the signal's value most closely corresponds to. The input of slicer 307 may also be termed a "combined signal" herein.

The decision element 307 accordingly produces a sequence of symbol decisions 308. In certain contemplated embodiments, the signal constellation is a bipolar (non-return-to-zero) constellation representing −1 and +1, necessitating only one comparator using a decision threshold of zero. In certain other contemplated embodiments, the signal constellation is PAM4 (−3, −1, +1, +3), necessitating three comparators employing the respective decision thresholds −2, 0, and +2. (The unit for expressing symbol and threshold values is omitted for generality, but for explanatory purposes may be presumed to be volts. In practice, a scale factor will be employed.) The comparator outputs can be taken collectively as a thermometer-coded digital representation of the output symbol decision, e.g., with 000 representing −3, 100 representing −1, 110 representing +1, and 111 representing +3. Alternatively, the comparator outputs could be converted into a binary or Gray-coded representation.

A feedback filter ("FBF") 444 derives the feedback signal using a series of delay elements (e.g., latches, flip flops, or registers) that store the recent output symbol decisions. Each stored symbol is multiplied with a corresponding filter coefficient $f_i$, and the products are combined to obtain the feedback signal.

The DFE-based receiver also includes a clock recovery circuit having a phase and frequency acquisition module 309 and a feedback loop that begins with timing error estimator 310. As an aside, we note here that the receivers each also includes a filter coefficient adaptation unit, but such considerations are addressed in the literature and are well known to those skilled in the art. Nevertheless, we note here that at least some contemplated embodiments include one or more additional comparators in the decision element 307 to be employed for comparing the equalized or combined signal to one or more of the symbol values, thereby providing an error signal that can be used for timing recovery and/or coefficient adaptation.

Figure 6:
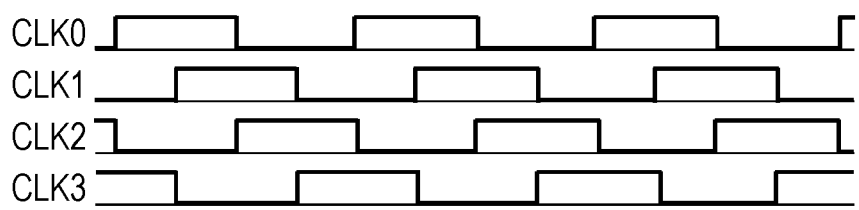
FIG. 6 is a graph of illustrative staggered clock signals.

As the symbol rates increase into the gigahertz range, it becomes increasingly difficult for the various receiver components to perform their required operations completely within each symbol interval, at which point it becomes advantageous to parallelize their operations. Parallelization generally involves the use of multiple components that share the workload by taking turns, and thereby providing more time for each of the individual components to complete their operations. Such parallel components are driven by staggered versions of a clock signal such as those shown in FIG. 6. A four-fold parallelization employs a set of four clock signals, each having a frequency that is one-fourth of the symbol rate so that each symbol interval contains only one upward transition in the set of staggered clock signals. Though a four-fold parallelization is used for discussion purposes here, the actual degree of parallelization can be higher, e.g., 8-, 16-, 32-, or 64-fold. Moreover, the degree of parallelization is not limited to powers-of-two.

Figure 5:
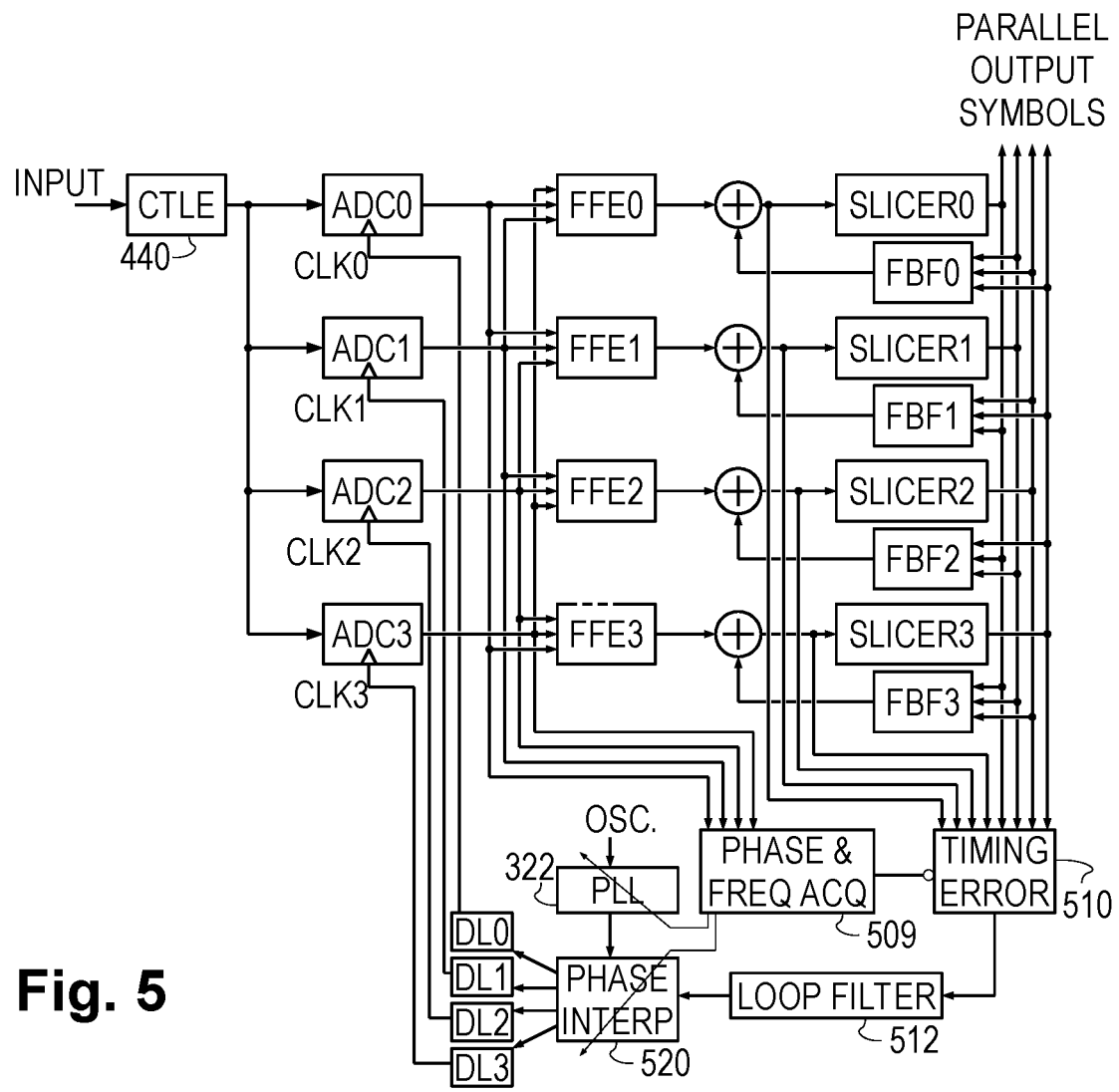
FIG. 5 is a block diagram of an illustrative parallelized DFE.

FIG. 5 shows an illustrative receiver having a parallelized equalizer implementation (including the optional feedback filters for DFE). As with the implementation of FIG. 4, the CTLE 440 filters the channel signal to provide a receive signal, which is supplied in parallel to a set of analog-to-digital converters (ADC0-ADC3). Each of the ADC elements is provided with a respective one of the staggered clock signals from FIG. 6 to provide a parallel set of sampled receive signals. The clock signals have different phases, causing the ADC elements to take turns sampling and digitizing the receive signal, so that only one of the ADC element outputs is transitioning at any given time.

An array of FFEs (FFE0-FFE3), each forms a weighted sum of the ADC element outputs. The weighted sums employ filter coefficients that are cyclically shifted relative to each other. FFE0 operates on the held signals from ADC3 (the element operating prior to CLK0), ADC0 (the element responding to CLK0), and ADC1 (the element operating subsequent to CLK0), such that during the assertion of CLK2, the weighted sum produced by FFE0 corresponds to the output of FFE 306 (FIG. 4). FFE1 operates on the held signals from ADC0 (the element operating prior to CLK1), ADC1 (the element responding to CLK1), and ADC2 (the element operating subsequent to CLK1), such that during the assertion of CLK3, the weighted sum corresponds to that of FFE 306. And the operation of the remaining FFEs in the array follow the same pattern with the relevant phase shifts. In practice, the number of filter taps may be smaller, or the number of elements in the array may be larger, so as to offer a longer window of valid output.

As with the receiver of FIG. 4, an adder may combine the output of each FFE with a feedback signal to provide an equalized signal to a corresponding decision element. FIG. 5 shows an array of decision elements (Slicer0-Slicer3), each operating on an equalized signal derived from a respective FFE output. As with the decision element of FIG. 4, the illustrated decision elements employ comparators to determine which symbol the equalized signal most likely represents. The decisions are made while the respective FFE outputs are valid (e.g., Slicer0 operates while CLK2 is asserted, Slicer1 operates while CLK3 is asserted, etc.). Preferably the decisions are provided in parallel on an output bus to enable a lower clock rate to be used for subsequent operations.

An array of feedback filters (FBF0-FBF3) operates on the preceding symbol decisions to provide the feedback signals for the summers. As with the FFEs, the inputs for the FBFs are shifted cyclically and provide a valid output only when the inputs correspond to the contents of the FBF 444 (FIG. 4), coinciding with the time window for the corresponding FFE. In practice, the number of feedback filter taps may be smaller than what is shown, or the number of array elements may be larger, so as to offer a longer window of valid output.

As with the decision element of FIG. 4, the decision elements in FIG. 5 may each employ additional comparators to provide timing recovery info, coefficient training info, and/or precomputation to unroll one or more taps of the feedback filter. In the embodiment of FIG. 5, the digital timing circuit is also parallelized, with a phase and frequency acquisition module 509 operating on receive signal samples during a training preamble to determine and correct initial phase and frequency offsets similar to module 309, a timing error estimator 510 accepting symbol decisions and equalized signals in parallel to determine the timing error estimates that would be produced by estimator 310. A timing loop filter 512 generates the timing control signal that would be produced by filter 312, and the phase interpolator 520 operates similarly to phase interpolator 320 to convert the PLL clock signal into a set of staggered clock signals having evenly spaced phases with symbol-aligned transitions. A set of delay lines (DL0-DL3) is provided for fine-tuning the individual clock phases relative to each other as needed to, e.g., compensate for different propagation delays of individual ADC elements.

In FIG. 5, the phase and frequency acquisition module 509 is shown inhibiting operation of the timing error estimator 510 (and accordingly the feedback loop) during initial acquisition, but this inhibition is optional in view of the limited loop bandwidth. Once the module 509 has determined the initial phase and frequency offsets, it can adjust the PLL 322 and phase interpolator 520 to compensate for the initial offsets before enabling the timing error estimator (and accordingly the feedback loop). Alternatively, or in addition, the phase and frequency acquisition module 509 may adjust contents of the integrators in the loop filter 512 to compensate for the initial offsets.

Figure 7:
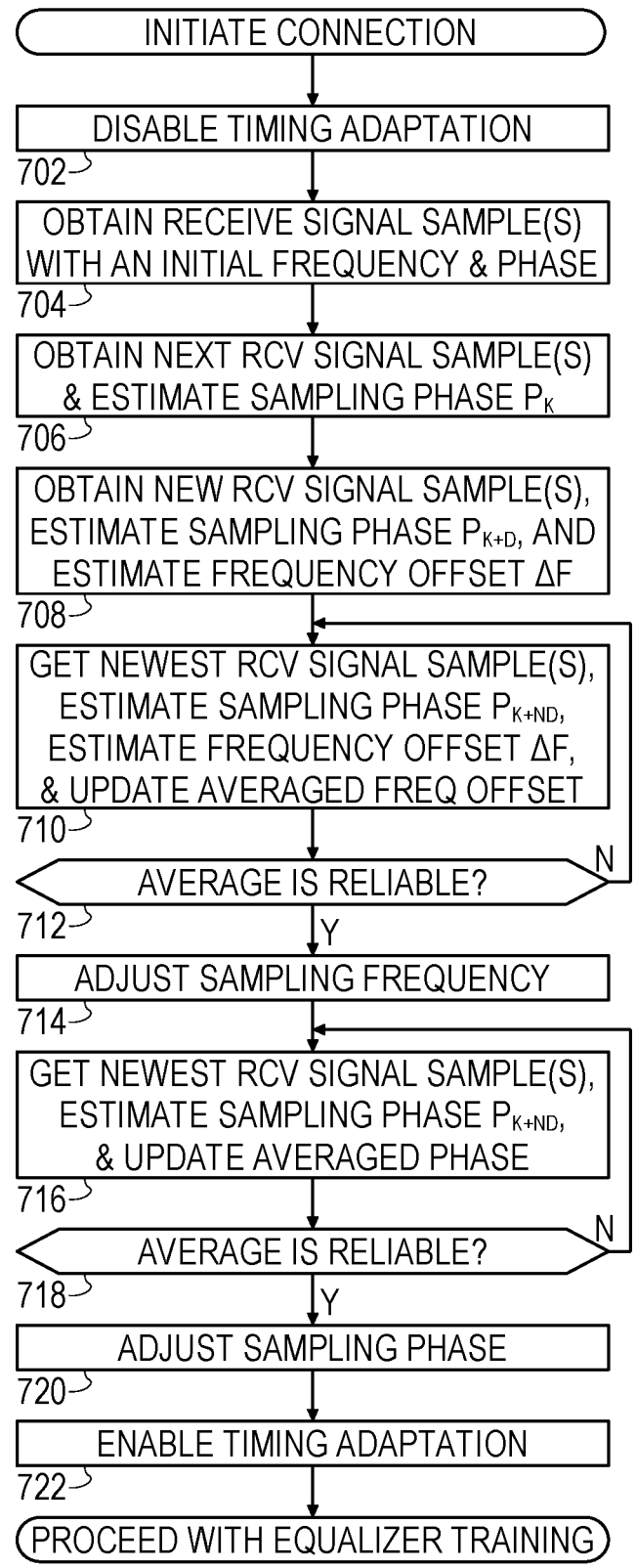
FIG. 7 is a flow diagram of an illustrative phase and frequency acquisition method.

FIG. 7 shows an illustrative method that may be implemented by the phase and frequency acquisition modules mentioned above, but certain derivations may be helpful to understanding the method and are accordingly described first. The acquisition may be performed while the transmitter sends a preamble pattern consisting of alternating doublets, also known as a 2T pattern, e.g., repetitions of the sequence [−3, −3, +3, +3]. On the receive side, the receive signal samples (provided by the analog to digital converter) or optionally, the equalized signal samples output by the FFE filter or DFE adder, will resemble a sinusoid:

$$x_k = A \cdot \cos(2\pi \cdot f_b \cdot kT/4 + \Pi_0) \quad (1)$$

where A is the 2T tone amplitude, $f_b$ the baud rate at the transmit side, 1/T the ADC sampling frequency, k the ADC sample index, and $\emptyset_0$ the initial sampling phase. This equation can be rewritten as:

$$x_k = A \cdot \cos\left(\frac{\pi}{2} \cdot f_b \cdot k(T_b + \Delta T) + \emptyset_0\right) \quad (2)$$

where $T_b = 1/f_b$, and the ADC sampling period $T = T_b + \Delta T$. Then (2) can be rewritten as:

$$x_k = A \cdot \cos\left(\frac{\pi}{2} \cdot k(1 + \Delta) + \emptyset_0\right) \quad (3)$$

where $\Delta = \Delta T / T_b$.

From (3) we have:

$$x_{k+1} = A \cdot \cos\left(\frac{\pi}{2} \cdot (k+1)(1 + \Delta) + \emptyset_0\right) \quad (4)$$

$$= A \cdot \cos\left(\frac{\pi}{2} \cdot k(1 + \Delta) + \frac{\pi}{2} + \frac{\pi}{2} \cdot \Delta + \emptyset_0\right)$$

$$= -A \cdot \sin\left(\frac{\pi}{2} \cdot k(1 + \Delta) + \frac{\pi}{2} \cdot \Delta + \emptyset_0\right)$$

Equations (3) and (4) can be combined:

$$\frac{x_{k+1}}{x_k} \approx -\tan\left(\frac{\pi}{2} \cdot k(1 + \Delta) + \emptyset_0\right) \quad (5)$$

Based on this equation, we can estimate the present ADC sampling phase as:

$$p_k = \operatorname{atan}\left(-\frac{x_{k+1}}{x_k}\right) \quad (6)$$

The sampling frequency acquisition is done as follows. Let $p_k, p_{k+1}, \ldots$ be the, unwrapped phase sequence from (6). Extending (4) and (5), we have the following:

$$p_{k+D} - p_k = \frac{\pi}{2} \cdot (k+D)(1 + \Delta) + \emptyset_0 - \left[\frac{\pi}{2} \cdot k(1 + \Delta) + \emptyset_0\right] \quad (7)$$

$$= \frac{\pi}{2} \cdot D \cdot (1 + \Delta)$$

where D is an integer number of sample intervals. From (7) we have:

$$1 + \Delta = 1 + \frac{\Delta T}{T_b} = \frac{T}{T_b} = \frac{f_b}{f_s} = (p_{k+D} - p_k) \cdot \frac{2}{\pi \cdot D} \quad (8)$$

where $f_s = 1/T$ is the ADC sampling frequency. From (8) we can estimate the normalized frequency offset $\Delta f$ as:

$$\Delta f = \frac{f_s - f_b}{f_b} = \frac{1}{1 + \Delta} - 1 = \pi \cdot \frac{D}{2(p_{k+D} - p_k)} - 1 \quad (9)$$

Averaging may be used to improve the estimate, either by averaging the estimated rate of change in the unwrapped phase sequence or by averaging the estimated normalized frequency offset over a given interval.

After the frequency offset has been corrected, or in situations where the ADC sampling frequency can be assumed to be close to the transmit baud rate, e.g., within a few hundred parts per million, the ADC sampling phase will be relatively constant and can be estimated by averaging the phase estimates $p_k$ over a given interval to obtain the average phase $\emptyset_{avg}$. The target sampling phase at the input to the decision element is $$\frac{\pi}{4}.$$

If we are deriving the phase estimate using receive signal samples, it is desirable to account for any phase shifts that may be created by the FFE filter. Representing the frequency response of the FFE at frequency f as F(f), let the phase shift of the FFE filter at $F(f_b/4)$ be denoted $\emptyset_{ffe}$. The target sampling phase for the ADC is then $$\emptyset_{target} = \frac{\pi}{4} - \emptyset_{ffe} \quad (10)$$

and can be predetermined for a given set of filter coefficients. The sampling phase offset $\emptyset_\Delta$ becomes $$\emptyset_\Delta = \emptyset_{target} - \emptyset_{avg} \quad (11)$$

The phase and frequency acquisition module can use this sampling phase offset to quickly correct the sampling phase by, e.g., adjusting the setting of the phase interpolator to compensate.

The foregoing derivation presumed the transmitter's use of a 2T preamble pattern. Another popular preamble pattern that may be used by the transmitter is the Nyquist pattern (a sequency of alternating polarity symbols such as −3, +3, −3, +3, . . . ). In this case, the receive signal sinusoid can be represented as $$r(t) = A \cdot \cos(2\pi \cdot f_b \cdot t/2 + \emptyset_0) \quad (12)$$

$$r(kT) = A \cdot \cos\left(2\pi \cdot f_b \cdot \frac{kT}{2} + \emptyset_0\right) = A \cdot \cos(k\pi \cdot (1 + \Delta) + \emptyset_0) \quad (13)$$

$$= (-1)^k \cdot A \cdot \cos(k\pi\Delta + \emptyset_0)$$

$$r\left(kT + \frac{T}{2}\right) = A \cdot \cos\left(2\pi \cdot f_b \cdot \frac{\left(k + \frac{1}{2}\right)T}{2} + \emptyset_0\right) \quad (14)$$

$$= A \cdot \cos\left(k\pi \cdot (1 + \Delta) + \emptyset_0 + \frac{\pi}{2} + \frac{\pi}{2} \cdot \Delta\right)$$

$$= (-1)^k \cdot A \cdot (-1) \cdot \sin\left(k\pi\Delta + \emptyset_0 + \frac{\pi}{2} \cdot \Delta\right)$$

Assume each ADC sampling cycle generates M samples, and the ADC sampling phase remains the same within one cycle. Let $x_{nm+i}$ be the $i^{th}$ sample of the $n^{th}$ ADC sampling cycle. At the $n^{th}$ ADC sampling cycle, we sample the ADC input signal as $$x_{nM+i} = r(nMT + iT) = (-1)^{nM+i} \sim A \cdot \cos((nM+i)\pi\Delta + \emptyset_0) \quad (15)$$

and at the $(n+1)^{th}$ ADC sampling cycle, we have $$x_{(n+1)M+i} = r\left((n+1)MT + iT + \frac{T}{2}\right) \quad (16)$$

$$= (-1)^{nM+i} \cdot A \cdot (-1) \cdot \sin\left((nM + M + i)\pi\Delta + \emptyset_0 + \frac{\pi}{2} \cdot \Delta\right)$$

From (15) and (16), we have $$\frac{x_{(n+1)M+i}}{x_{nM+i}} \approx -\tan((nM + i)\pi\Delta + \emptyset_0) \quad (17)$$

Let $$p_{n,i} = \operatorname{atan}\left(-\frac{x_{(n+1)M+i}}{x_{nM+i}}\right), \quad (18)$$

so that $$p_{n,i} \approx (nM+i)\pi\Delta + \emptyset_0 \quad (19)$$

$$p_{n,i+D} - p_{n,i} = D\pi\Delta \quad (20)$$

Then, the normalized frequency offset $\Delta f$ is given as $$\Delta f \approx \frac{p_{n,i+D} - p_{n,i}}{\pi D} \quad (21)$$

The estimated normalized frequency offset can be improved by averaging the estimates over a given interval.

After the frequency offset has been corrected, or in situations where the ADC sampling frequency can be assumed to be close to the transmit baud rate, e.g., within a few hundred parts per million, the ADC sampling phase will be relatively constant and can be estimated by averaging the phase estimates $p_{n,i}$ from equation (18) over a given interval to obtain the average phase $\emptyset_{avg}$. For sampling phase acquisition, the target sampling phase should be the phase such that the power of sampled tone of Nyquist frequency, $f_b/2$, is maximized, which is equivalent to sampling at the peak of the tone. Taking the target sampling phase as $$\emptyset_{target} = \frac{\pi}{2} - \emptyset_{ffe} \quad (22)$$

the sampling phase offset $\emptyset_\Delta$ becomes $$\emptyset_\Delta = \emptyset_{target} - \emptyset_{avg} \quad (23)$$

If acquiring phase and frequency offsets is performed using equalized samples rather than receive signal samples, the phase shift of the FFE filter is already taken into account, and in equations 10 and 22, $\emptyset_{ffe}=0$.

Returning now to FIG. 7, the phase and frequency acquisition module may be used during link initiation when the remote transmitter is expected to be transmitting a preamble. In block 702, the module optionally disables the feedback loop by, e.g., disabling the timing error detector. In block 704, the module obtains receive signal sample(s), either one at a time as provided in FIGS. 3 and 4, or in batches as provided in FIG. 5. The sampling clock for obtaining the samples has an initial phase and frequency that may be offset from the transmit baud rate and from the target sampling phase.

In block 706, the module obtains additional receive signal sample(s), combining them with the previous receive signal sample(s) to obtain a sampling phase estimate. In block 708, the module obtains still more receive signal sample(s) to obtain an updated sampling phase estimate. The module derives an estimated frequency offset from the trend in sampling phase estimates. In block 710, more receive signal sample(s) are obtained to provide updated sampling phase estimates and new estimates of the frequency offset which may be combined with previous estimates, e.g., by averaging, to improve the reliability of the frequency offset estimate. In block 712, the module determines whether the estimate is sufficiently reliable by, e.g., determining whether enough estimates have been averaged together. Blocks 710 and 712 may be repeated until sufficient reliability is achieved.

In block 714, the module uses the estimated frequency offset to adjust the frequency of the sample clock. This adjustment may take the form of adjusting a control voltage of a voltage-controlled oscillator, adjusting a phase-lock loop frequency divider, and/or adjusting an accumulator value in a clock recovery feedback loop. In each case, the adjustment is readily derived from the estimated frequency offset.

In block 716, the module obtains receive signal sample(s) using the sample clock with the adjusted frequency and estimates the sampling phase. In block 718, the module determines whether the phase estimate is sufficiently reliable, e.g., whether enough estimates have been averaged together. Blocks 716 and 718 may be repeated until sufficient reliability is achieved. In block 720, the module uses the estimated phase to calculate a phase offset and adjusts the sample clock phase to compensate for the phase offset. This adjustment may take the form of adjusting a sample clock delay, adjusting a phase interpolator setting, and/or adjusting an accumulator value in a clock recovery feedback loop. In each case, the adjustment is readily derived from the estimated phase offset.

In block 722, the module enables the clock recovery feedback loop, e.g., by enabling the timing error calculator. Thereafter, the clock recovery feedback loop operates to minimize timing error in the usual fashion, and the receiver can proceed with training of equalizer coefficients, if needed. Though the operations of FIG. 7 have been shown and described in a sequential fashion, the operations may be reordered and/or implemented concurrently. For example, the phase offset estimation may be performed before, or concurrently with, the frequency offset estimation.

Simulations were carried out to verify the performance of the proposed fast sampling phase and frequency acquisition. The PAM4 2T patterns [−3, −3, +3, +3] at 52.125 Gbd were transmitted over a channel with 13 dB loss at the Nyquist frequency. The ADC digitized the receive signal with 7-bit resolution. For sampling phase acquisition, 64 PAM4 symbols were used for the phase offset estimation. The average phase estimation error magnitude is less than 0.014 channel symbol intervals (UI) and mostly below 0.010 UI. For the sampling frequency acquisition, 128 PAM4 symbols were used to estimate the frequency offset. The frequency estimation error had a root-mean-square value of 18.58 ppm for an initial 100 ppm frequency offset, and 19.27 ppm for an initial 200 ppm frequency offset. In these experiments, fewer than 200 channel symbols (less than 2.3 nanoseconds) were required for the phase and frequency acquisition module to provide reasonably good sampling phase and frequency matching.

The phase and frequency acquisition module may be implemented as application specific integrated circuitry. The arctangent calculation for phase estimation may be implemented using an iterative calculation circuit that implements the coordinate rotation digital computer (CORDIC) technique, or by using a non-iterative polynomial approximation technique. Alternatively, the method may be implemented as firmware programming for a microcontroller or programmable digital signal processor.

It is contemplated that the disclosed phase and frequency acquisition module can be incorporated into SerDes cores for use by integrated circuit designers and manufacturers creating devices for a host of applications that might benefit from cost-, complexity-, and power-efficient high-bandwidth communications. Numerous alternative forms, equivalents, and modifications will become apparent to those skilled in the art once the above disclosure is fully appreciated. For example, the disclosed principles are applicable to both PAM, QAM, and PSK modulation, and to larger signal constellations including 8-PSK, 16-PAM, etc. It is intended that the claims be interpreted to embrace all such alternative forms, equivalents, and modifications that are encompassed in the scope of the appended claims.

The foregoing integrated circuits would typically be created using masks for patterning layers on semiconductor substrates during an integrated circuit manufacturing process. The mask patterns can be generated using commercially available software for converting the semiconductor IP cores (usually expressed using a hardware description language such as Verilog) into semiconductor process masks. The circuits may be sub-units of more complex integrated circuit devices whose designs have been built up from modular components in a design database which resides on nontransient information storage media. Once the circuits are fully designed, software may convert the integrated circuits into semiconductor mask patterns also stored on a nontransient information storage medium and conveyed to the various process units in a suitable assembly line of an integrated circuit manufactory.

What is claimed is:

1. A receiver comprising an integrated circuit having:
   an analog to digital converter that samples a receive signal in accordance with a sample clock to provide a sampled receive signal; and
   a clock recovery circuit that includes:
      a phase and frequency acquisition module to determine and correct an initial frequency offset and an initial phase offset of the sample clock in part by:
         obtaining a sampling clock phase estimate from each of multiple pairs of the receive signal samples during a preamble period; and
         differencing the sampling clock phase estimates to determine the initial frequency offset; and
      a feedback loop to minimize timing error of the sample clock after the initial frequency offset and the initial phase offset have been corrected.

2. The receiver of claim 1, wherein the analog to digital converter is one of a set of analog to digital converters that sample the receive signal in response to staggered versions of the sample clock to provide a parallel set of sampled receive signals.

3. The receiver of claim 1, wherein the integrated circuit includes an equalizer that converts the sampled receive signal into an equalized signal, and wherein the phase and frequency acquisition module uses the equalized signal to derive the initial frequency offset and the initial phase offset.

4. The receiver of claim 3, wherein the phase and frequency acquisition module estimates a sampling clock phase using ratios of received signal sample pairs during a preamble period.

5. The receiver of claim 4, wherein the sampling clock phase estimates are each calculated as an arctangent of one of said ratios.

6. The receiver of claim 1, wherein the clock recovery circuit further includes a phase lock loop having an initial division ratio, the phase and frequency acquisition module being configured to correct the initial frequency offset by adjusting the initial division ratio.

7. The receiver of claim 1, wherein the clock recovery circuit further includes a phase interpolator having an initial phase setting, the phase and frequency acquisition module being configured to correct the initial phase offset by adjusting the initial phase setting.

8. A method that comprises:
   sampling a receive signal in response to a sample clock to provide receive signal samples, the sample clock having an initial frequency;
   obtaining a sampling clock phase estimate from each of multiple pairs of the receive signal samples;
   differencing the sampling clock phase estimates to determine an initial frequency offset; and
   correcting a source of the sample clock to compensate for the initial frequency offset.

9. The method of claim 8, further comprising:
   combining at least some of the sampling clock phase estimates to obtain an initial phase offset; and
   correcting a source of the sample clock to compensate for the initial phase offset.

10. The method of claim 9, further comprising, after correcting the source of the sample clock to compensate for the initial frequency offset and the initial phase offset, enabling a clock recovery loop to minimize timing error.

11. The method of claim 8, wherein said obtaining the sampling clock phase estimate includes equalizing each of the receive signal samples in the pair of receive signal samples.

12. The method of claim 8, wherein said obtaining the sampling clock phase estimate is performed during a preamble period.

13. The method of claim 12, wherein each sampling clock phase estimate is an arctangent of a ratio between the receive signal samples or between equalized versions of the receive signal samples.

14. A non-transitory information storage medium having a semiconductor intellectual property core to generate circuitry comprising:
- a clock circuit configured to provides a sample clock;
- an analog to digital converter configured to sample a receive signal in accordance with the sample clock to provide a sampled receive signal; and
- a clock recovery circuit that includes:
  - a phase and frequency acquisition module configured to determine and correct an initial frequency offset and an initial phase offset of the sample clock in part by:
    - obtaining a sampling clock phase estimate from each of multiple pairs of the receive signal samples during a preamble period; and
    - differencing the sampling clock phase estimates to determine the initial frequency offset; and
  - a feedback circuit configured to minimize timing error of the sample clock after the initial frequency offset and initial phase offset have been corrected.

15. The non-transitory information storage medium of claim 14, wherein the analog to digital converter is one of a set of analog to digital converters configured to sample the receive signal in response to staggered versions of the sample clock to provide a parallel set of sampled receive signals.

16. The non-transitory information storage medium of claim 14, wherein the circuitry includes an equalizer configured to convert the sampled receive signal into an equalized signal, and wherein the phase and frequency acquisition module is configured to use the equalized signal to derive the initial frequency offset and the initial phase offset.

17. The non-transitory information storage medium of claim 16, wherein the phase and frequency acquisition module is configured to estimate the sampling clock phase as an arctangent of a ratio between equalized signal samples during a preamble period.

18. The non-transitory information storage medium of claim 17, wherein the phase and frequency acquisition module is configured to estimate the initial frequency offset based on differences between the sampling clock phase estimates.

\* \* \* \* \*